Feb. 13, 1962  R. S. DICKINSON  3,021,153
LOAD COMPENSATING ARRANGEMENT FOR A VEHICLE SUSPENSION
Filed Dec. 3, 1959  12 Sheets-Sheet 1
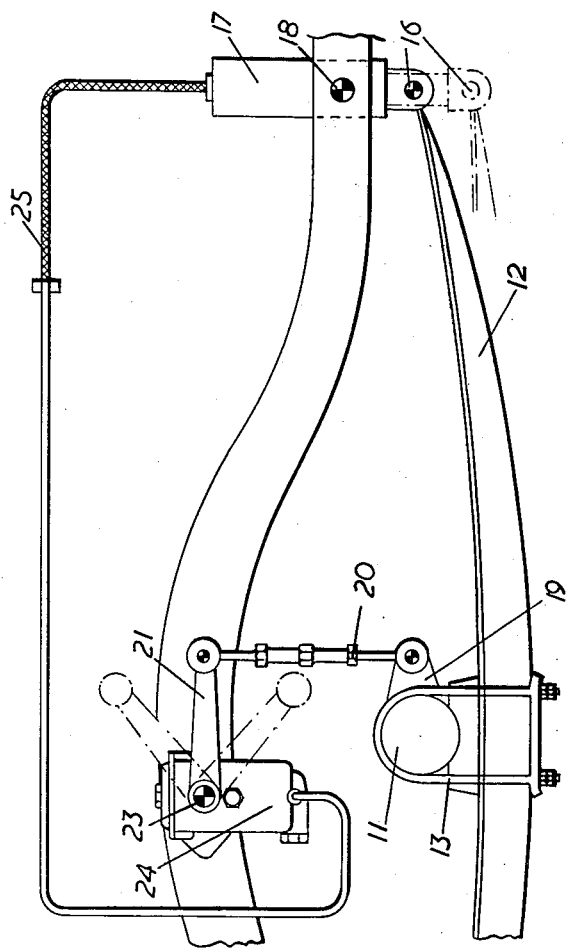
F/G./
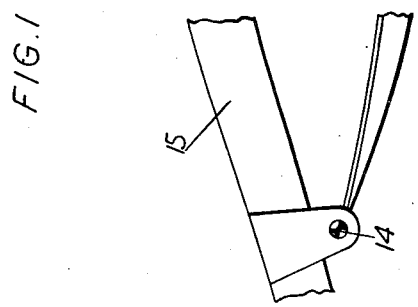
RONALD SIDNEY DICKINSON
INVENTOR
BY
Mead, Browne, Schuyler & Beveridge
ATTORNEYS

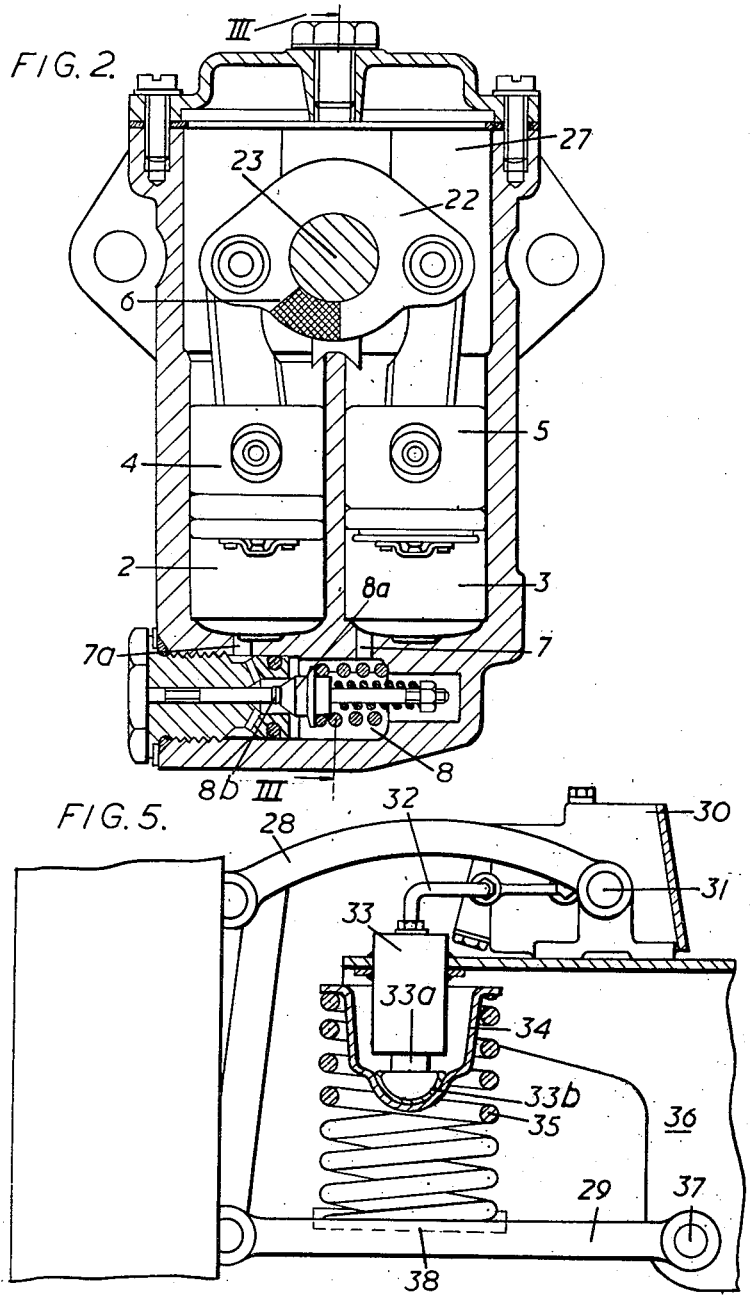

Feb. 13, 1962  R. S. DICKINSON  3,021,153
LOAD COMPENSATING ARRANGEMENT FOR A VEHICLE SUSPENSION
Filed Dec. 3, 1959  12 Sheets-Sheet 4

Ronald Sidney Dickinson
INVENTOR

BY
Mead Browne Schuyler & Beveridge
ATTORNEYS

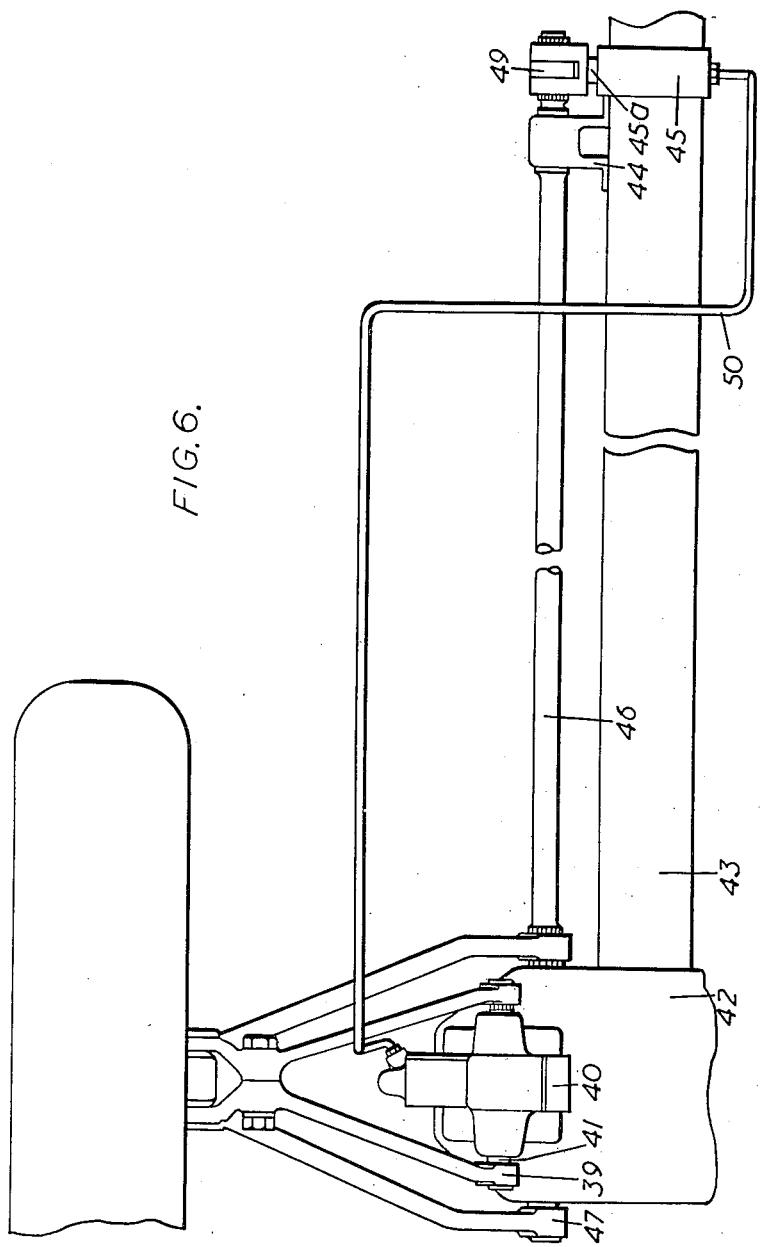

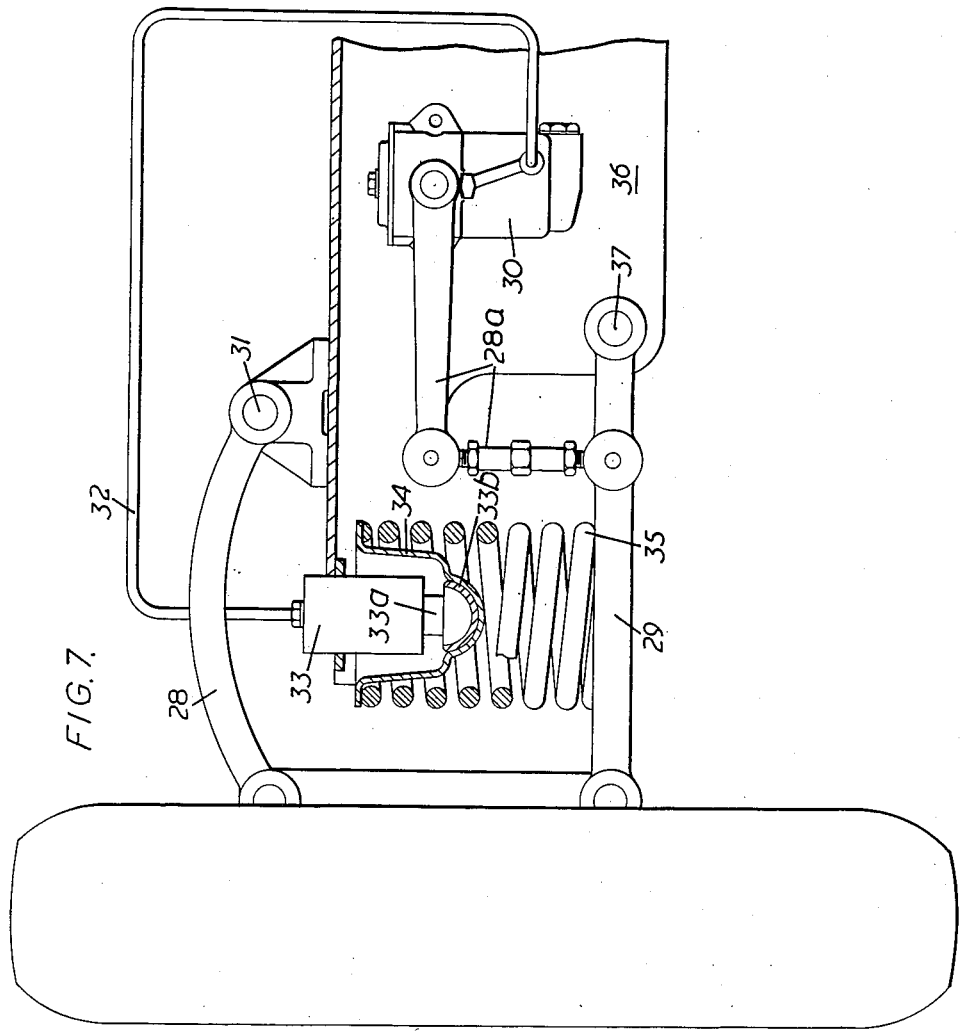

Feb. 13, 1962 R. S. DICKINSON 3,021,153
LOAD COMPENSATING ARRANGEMENT FOR A VEHICLE SUSPENSION
Filed Dec. 3, 1959 12 Sheets-Sheet 7

RONALD SIDNEY DICKINSON
INVENTOR

BY
Mead, Browne, Schuyler & Beveridge
ATTORNEYS

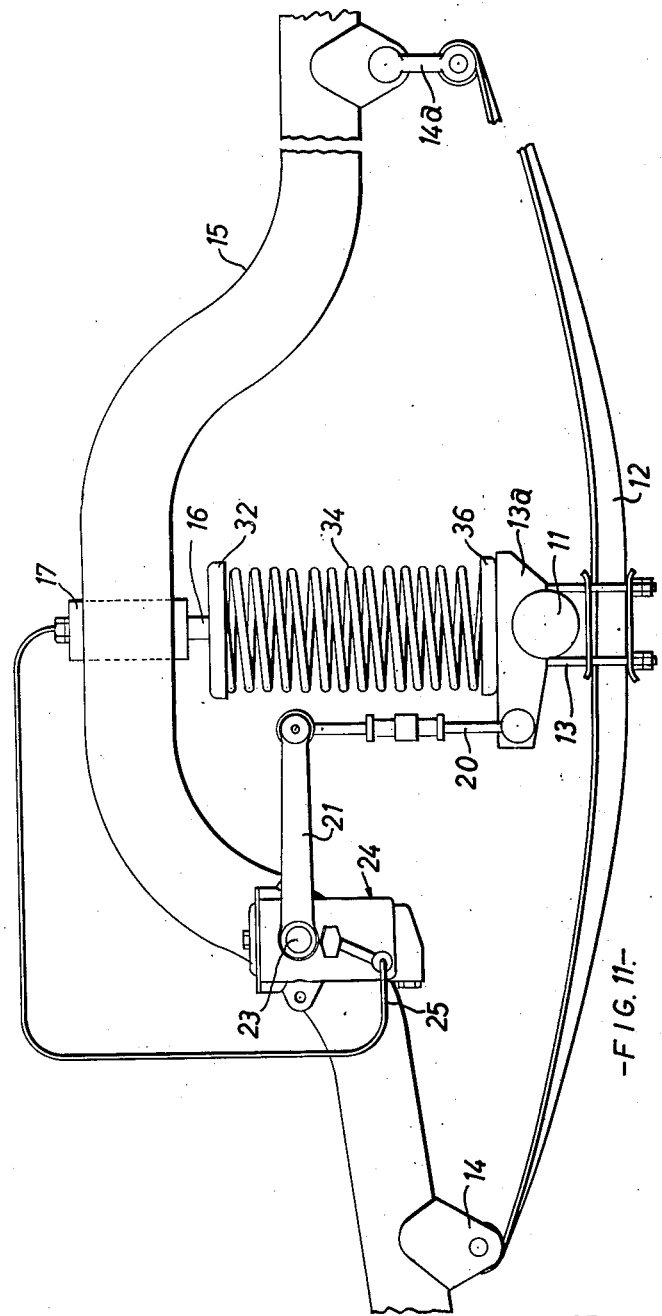

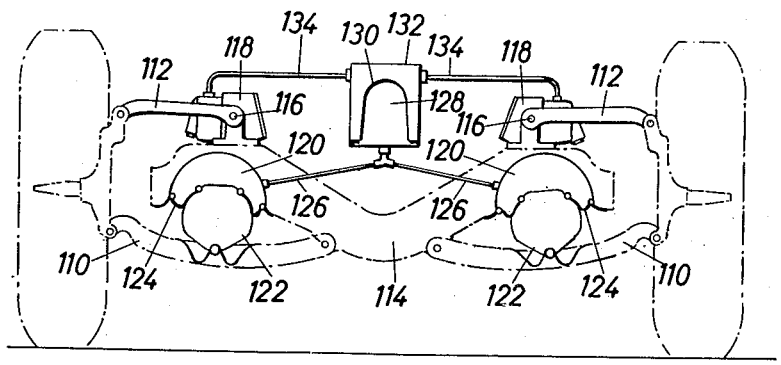
—FIG. 12.—
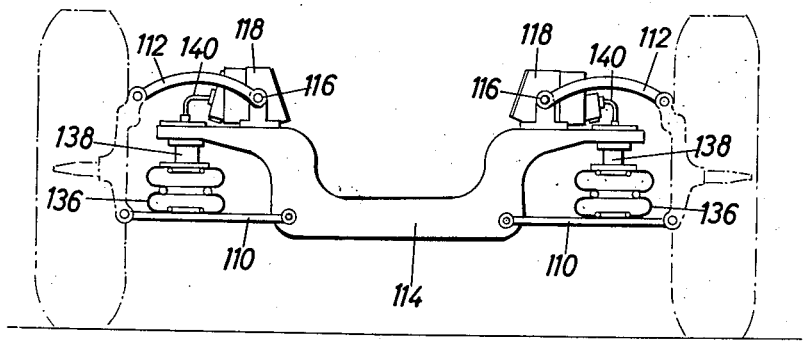
—FIG. 13.—

Feb. 13, 1962 R. S. DICKINSON 3,021,153
LOAD COMPENSATING ARRANGEMENT FOR A VEHICLE SUSPENSION
Filed Dec. 3, 1959 12 Sheets-Sheet 11
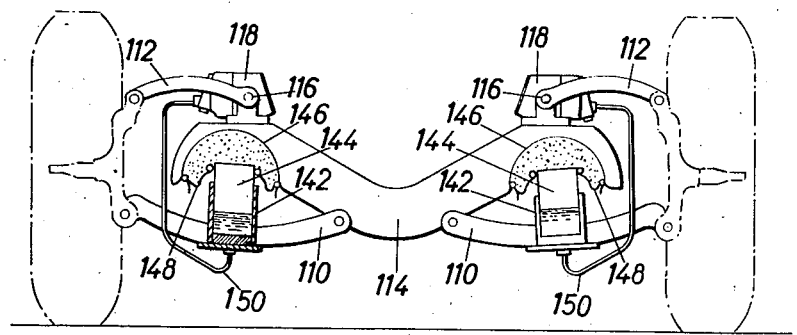
—FIG.14.—
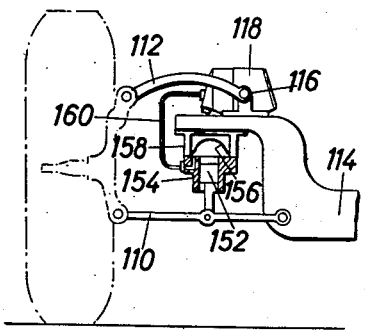
—FIG.15.—
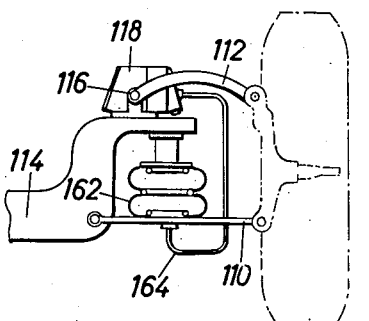
—FIG.16.—
RONALD SIDNEY DICKINSON
INVENTOR
BY
ATTORNEYS United States Patent Office 3,021,153
Patented Feb. 13, 1962

3,021,153
LOAD COMPENSATING ARRANGEMENT FOR A VEHICLE SUSPENSION
Ronald Sidney Dickinson, Osbaldwick, York, England, assignor to Armstrong Patents Co. Limited, Beverly, England, a British company
Filed Dec. 3, 1959, Ser. No. 857,114
Claims priority, application Great Britain May 30, 1957
19 Claims. (Cl. 280—124)

The present invention concerns road vehicle suspension systems.

In most types of vehicle suspensions, especially those utilising metal suspension springs, the distance between the wheel mounting and the chassis or frame is variable, being dependent upon the load carried by the chassis or frame and the resilience of the springs supporting the chassis or frame from the wheel mountings.

An object of the present invention is to provide an arrangement for maintaining a substantially uniform distance between the wheel mounting and the chassis or frame of a motor vehicle, irrespective of the loading conditions on the vehicle chassis or frame.

Another object of the invention is to provide a load compensating arrangement for a vehicle suspension in which hydraulic pump means operable responsive to normal road surface irregularities are employed in co-operation with hydraulic relief means to maintain the displacement between a vehicle wheel mounting and the vehicle frame within a predetermined range of displacements.

Yet another object of the invention is to provide hydraulic ram means having a cylinder member with a movable member therein adapted to modifiy the attitude of a suspension spring relative to the vehicle frame responsive to changes in vehicle loading.

These and other objects of the invention will be described further, by way of example, with reference to the accompanying drawings, in which:

FIG. 1 is a diagrammatic side elevation showing a vehicle leaf spring suspension means in accordance with the invention;

FIG. 2 is a sectional elevation of a shock absorber and control unit, taken along the line II—II of FIG. 3;

FIG. 5 is an end elevation of a vehicle coil spring suspension embodying the invention;

FIG. 6 is a plan view of a torsion spring suspension embodying the invention.

FIG. 7 is a modification of the construction shown in FIG. 5;

FIG. 11 is a diagrammatic side elevation showing the combination of an auxiliary coil spring with a leaf spring suspension similar to that of FIG. 1;

FIGS. 12 to 16 are generally diagrammatic end elevations of embodiments of the invention employing pneumatic springs.

Throughout the drawings, similar reference numerals are employed wherever appropriate to denote similar parts.

Figure 3:
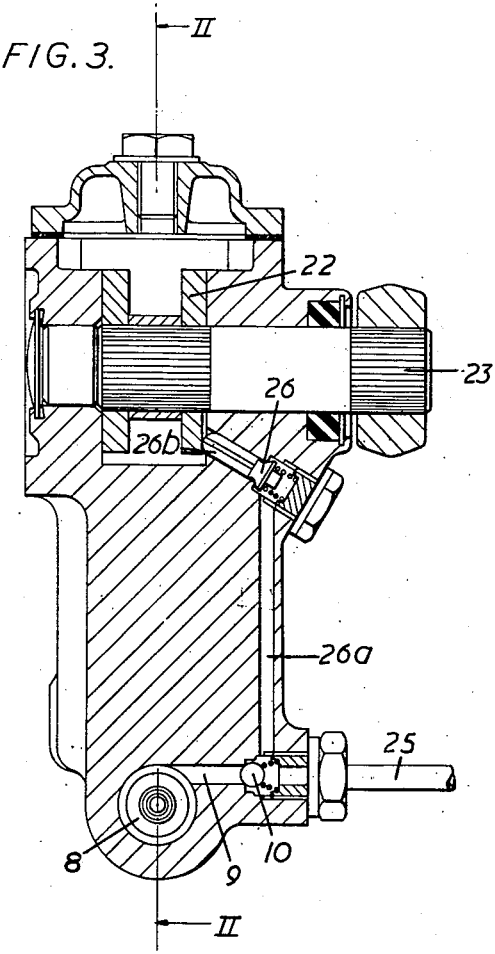
FIG. 3 is a sectional elevation on the line III—III of FIG. 2.
Figure 4:
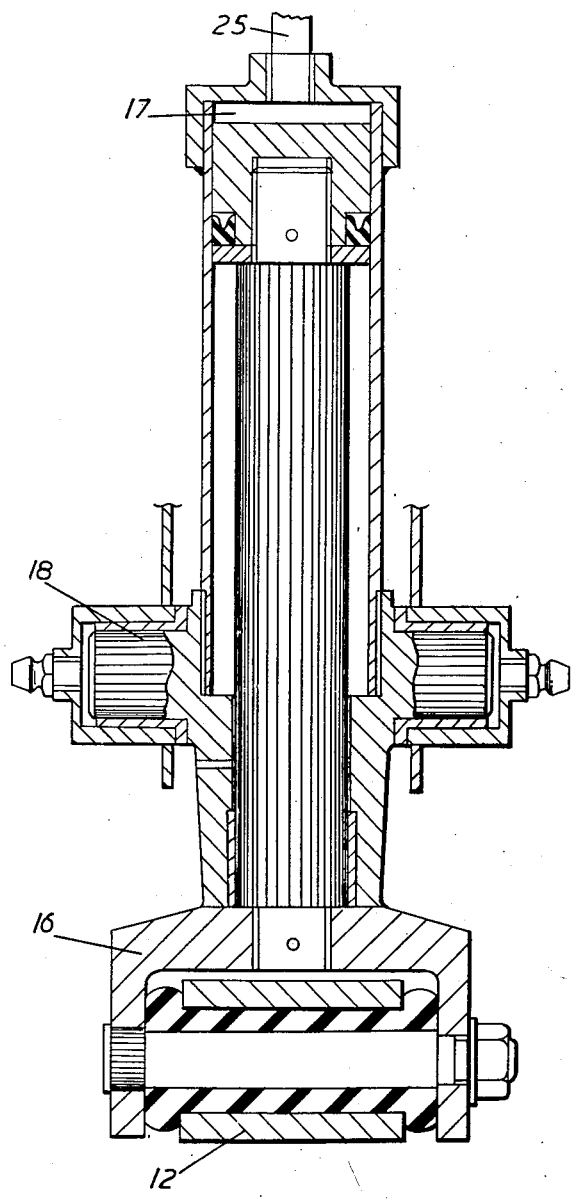
FIG. 4 is a sectional elevation of the hydraulic ram mechanism.

In the embodiment illustrated in FIGS. 1 to 4 of the drawings, a wheel axle 11 is attached to a leaf suspension spring 12 by way of U-bolts 13. The leaf spring 12 is pivotally attached at one of its ends to a connection 14 on a vehicle chassis member 15, and has its other end pivotally connected to a hydraulic ram 16, adapted to associate with a cylinder 17 mounted in trunnion bearings 18 on the chassis member 15. A preferred arrangement of ram 16, cylinder 17 and trunnion bearings 18 is shown in FIG. 4.

The axle member 11 has rigidly attached thereto an arm 19, the outer end of which is pivotally connected to one end of a connecting rod or link 20. The link 20, which may be adjustable in length somewhat in the manner of a turnbuckle, is pivotally attached at its opposite end to a control arm or lever arm 21 secured to a semi-rotating or rocking shaft 23 of a hydraulic medium control unit 24, which forms part of a shock absorber of the double acting lever type provided on the vehicle. The lever arm 21 is arranged to occupy a predetermined mean position, which may conveniently be horizontal or thereabouts, when the vehicle is at its desired riding height. A hydraulic line 25 is arranged to allow passage to the hydraulic medium under pressure between the control unit 24 and the hydraulic cylinder 17. The control unit 24, as more particularly shown in FIGS. 2 and 3, comprises a pair of substantially parallel cylinders 2 and 3 having therein pistons 4 and 5, the connecting rods of which are associated with a yoke 22 rigidly secured to the semirotary shaft 23, the arrangement being such that angular displacement of the rocking shaft 23 occasioned by riding movements of the axle 11 transmitted through lever arm 21 and link 20 causes the pistons to be displaced within their respective cylinders.

For the purposes of the invention, either or both the rebound or the compression cylinder of the combined shock absorber and control arrangement shown may be employed as a pump adapted to transfer hydraulic medium to the ram cylinder 17 under conditions of increased vehicle loading. The cylinders 2 and 3 communicate with one another by way of ports 7 and 7a at their lower ends, and through valve chamber 8 wherein are arranged valves 8a and 8b adapted to provide differential pressure paths to hydraulic medium between the two cylinders, on compression and rebound movements of the axle 11. In FIGS. 2 and 3, the cylinder 3 is shown as co-operating with its piston 5 to constitute the pump supplying the ram cylinder 17 with hydraulic medium which is placed under pressure by the pump against the reaction of the shock absorber valves 8a and 8b. The cylinder 3 communicates via port 7, valve chamber 8 and passage 9, which is controlled by a non-return valve 10, with the conduit 25. A means sensitive to the riding height of the vehicle is constituted by a relief valve 26 communicating with conduit 25 by way of passage 26a, the valve 26 being placed in open or closed condition by means of a depressed cam surface 6 formed on the yoke 22 and arranged to act on the stem 26b of the valve 26. It will be appreciated that the cam surface 6 may be formed separately from the yoke 22 if desired. The valve stem 26b is provided with longitudinal grooves to enable hydraulic medium flowing through the passage 26a to pass to a reservoir chamber 27 and/or an auxiliary reservoir provided in or independently of the combined shock absorber and control arrangement 24 above the cylinders 2 and 3 thereof. The cam surface 6 is so arranged on the yoke 22 as to be just incident upon the valve stem 26b when the piston 5 is at a desired mean position in the cylinder 3, and the vehicle is at a desired riding height.

In the operation of the embodiment of the invention illustrated in FIGS. 1 to 4, assuming firstly that the vehicle is at its desired riding height, and that the cam surface 6 is incident upon the valve stem 26b of the relief valve 26, riding movements of the wheel axle 11 arising from continued travel of the vehicle will be transmitted by the link 20 and lever arm 21 to the rocking shaft 23 and hence to the yoke 22. The pistons 4 and 5 will hence oscillate in their cylinders 2 and 3 in conventional manner to co-operate with the valves 8a, 8b in imparting shock absorbing action to the axle 11, and this motion of the piston 5 in its cylinder 3 will cause hydraulic medium to be transferred through the conduit 25 to the ram cylinder 17. The ram 16 is thus slightly displaced from the cylinder 17, and slightly raises the chassis member 15 relative to the leaf spring 12. Immediately this happens, however, the shaft 23 is angularly displaced by the consequent depression of the lever arm 21 by the link 20 and arm 19, and the yoke is angularly displaced to depress the valve stem 26b and lift the valve 26 momentarily off its seat. Thus, the ram cylinder 17 is placed, by way of conduit 25, passage 26a and valve 26 in communication with the reservoir 27 and a small quantity of hydraulic medium is allowed by the momentary opening of valve 26 to exhaust from the ram cylinder into the reservoir, until the ram 16 has restored the spring 12 and chassis member 15 to their desired mean spacing. As long as the load on the vehicle remains unchanged, therefore, the operation of the suspension remains as described above, with momentary opening and closing of the valve 26 taking place to maintain the vehicle at a mean riding height despite the constant pumping action of the piston 5.

Should the load on the vehicle be increased, however, so that the chassis member 15 sinks towards the spring 12 and the axle 11, and the arm 19 and link 20 lift the lever arm 21 above its normally horizontal mean position, then the yoke 22 is moved anticlockwise by the shaft 23, and the cam surface 6 comes into register with the valve stem 26b, causing the valve 26 completely to close. Continued riding movements of the vehicle then cause the piston 5, in oscillating due to those movements, to pump hydraulic medium from the cylinder 3 to the ram cylinder 17, whereby the ram 16 is displaced from the cylinder to restore the spacing between the chassis member 15 and spring 12 to its mean value, thus restoring the vehicle riding height to its desired mean value. Displacement of the ram 16 from the cylinder 17 continues, of course, until consequent clockwise movement of the yoke 22 resulting from the restoring effect of the ram 16 moves the cam surface 6 off the valve stem 26b and allows valve 26 to resume the repeated momentary opening and closing procedure described above.

Conversely, should the load on the vehicle be decreased, then the yoke 22 is moved clockwise as the spacing between the chassis member 15 and the spring 12 increases, and consequently hydraulic medium is allowed to exhaust from the ram cylinder 17 back into the reservoir 27 until the ram 16 has re-entered the cylinder 17 to an extent sufficient to restore the spring and axle spacing to its required mean value.

The application of the invention to a coil spring suspension is shown in FIG. 5, where the wheel mounting is carried by upper and lower wishbones 28 and 29 or other suitable link members, and a coil spring 35 is arranged between the lower wishbone 29 and a member 36 secured to the vehicle frame or chassis (not shown). The inner end of the upper wishbone is pivoted to a rocking shaft 31 which forms a part of a combined shock absorber and control means 30 identical with the similar means 24 of FIGS. 1 to 3, the means 30 being rigidly mounted on the fixed member 36. Where it is not desired to incorporate the shock absorber and control means 30 as an integral part of the suspension however, and said means 30 is secured to the frame or chassis independently of the suspension, the upper wishbone may, as in the case of the lower wishbone, be directly pivoted to the frame or chassis (see FIG. 7) and a lever arm 28a may be connected between the lower wishbone and the means 30 to sense the attitude of said wishbone. In the illustrated arrangement, the inner end of the lower wishbone is also pivoted by means of a fulcrum pin 37 to the fixed member 36, and secured to the latter is a ram cylinder 33 housing a ram 33a terminating in a semispherical coupling 33b which mates with a dished upper support 34 for the upper end of the spring 35. The coil spring 35 thus suspends the vehicle chassis or frame between the upper support 34 and a lower support 38 which spans the two legs of the lower wishbone 29. The ram cylinder 33 is connected by a conduit 32 to the combined shock absorber and control means 30.

In operation, this embodiment of the invention functions in a manner largely identical with that of the embodiment of FIGS. 1 to 4, except that the lever arm 21 of the latter is replaced in FIG. 5 by the upper wishbone 28, which is responsible for angular displacement of the rocking shaft 31. This shaft 31 carries the yoke 22 formed with the cam surface 6, and is hence adapted, by way of the upper wishbone 28, to sense the riding height of the vehicle. As long as that riding height is at its desired value, the wishbone 28 so positions the shaft 31, yoke 22 and cam surface 6 as to permit repeated momentary openings of the relief valve 26 as already described. On increased vehicle loading, however, the relief valve 26 is closed by the cam surface 6, and the hydraulic medium transferred to the ram cylinder 33 by the pumping action of the piston 5 extends the ram 33a to raise the height of the member 36 relative to the lower wishbone 29 and support 38, thus compensating for the decrease in height resulting from the increased loading. Conversely, on decreased loading, the relief valve 26 is opened by movement of the yoke 22 and cam surface 6 to allow hydraulic medium from the ram cylinder 33 to exhaust into the reservoir 27, whereby the ram 33a is allowed to retract to decrease the height of the member 36 relative to the lower wishbone 29 and support 38, so as to compensate for the height increase resulting from the decreased vehicle loading.

FIG. 6 shows another embodiment of the invention, as applied to a torsion spring suspension, wherein an upper wishbone 39 pivots at its inner end on a rocking shaft 41 again corresponding to the shaft 23 of FIGS. 1 to 3, and forming part of a combined shock absorber and control means 40 corresponding to the similar means 24 of FIGS. 1 to 3. The means 40 is rigidly secured to a member 42, which is in turn fixedly carried by the frame or chassis 43 of the vehicle, and the frame or chassis 43 also has attached thereto a torsion bar bearing bracket 44 and a hydraulic ram cylinder 45, the latter housing a ram 45a. A torsion bar spring 46 is journalled in the bracket 44 and in the member 42, and, in addition to its normal function, also acts as a fulcrum for a lower wishbone 47, to which it is attached by splining. The torsion bar is likewise attached by splining to a lever arm 49, the end of which is pivotally secured to the hydraulic ram 45a, and a conduit 50 is connected between the ram cylinder 45 and the combined shock absorber and control means 40.

Figure 8:
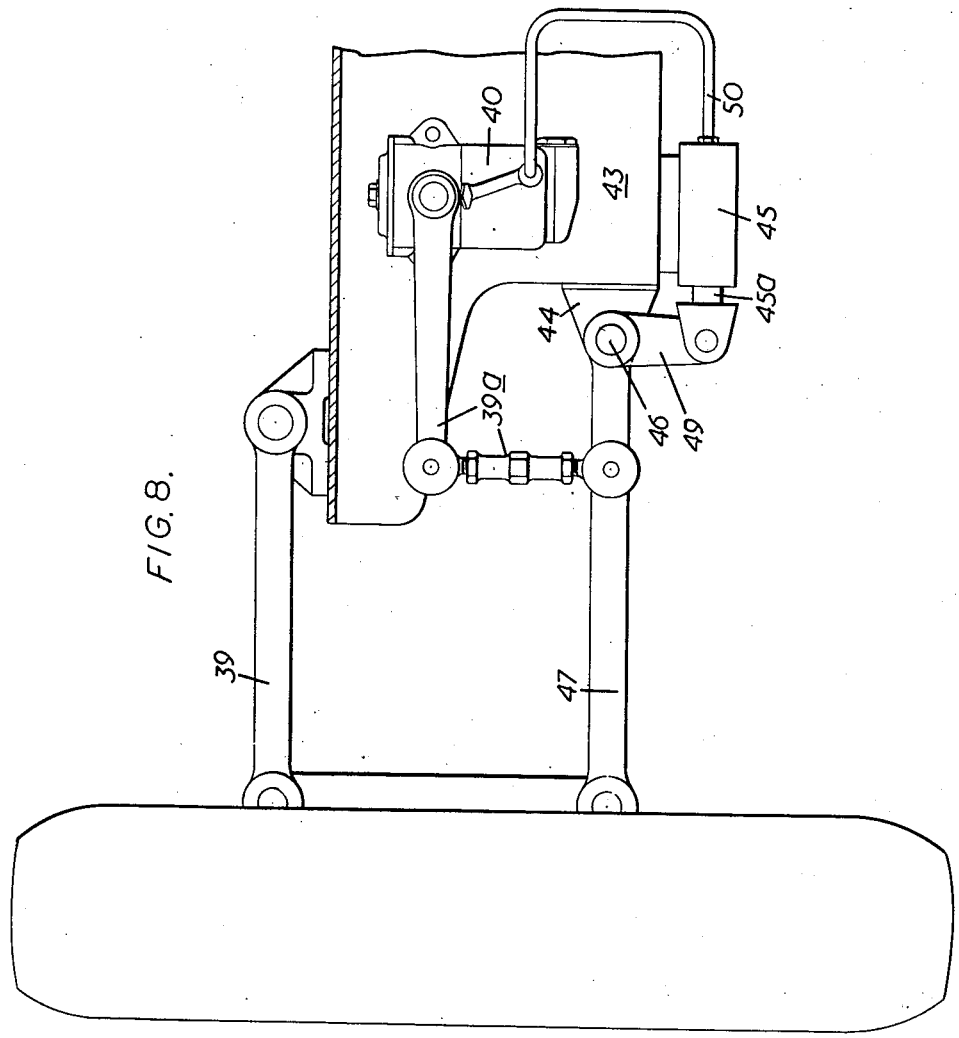
FIG. 8 is a modification of the construction shown in FIG. 6.

The operation of this embodiment of the invention is again essentially similar to that of the embodiment of FIGS. 1 to 3, with the upper wishbone 39 taking the place of the lever arm 21 to angularly displace the shaft 41 and hence the yoke 22 and cam surface 6 thereon. When the vehicle is at its desired mean riding height, as determined by the attitude of the upper wishbone 39, the cam surface 6 allows repeated momentary opening of the relief valve 26 to maintain that riding height despite the continual pump action of the piston 5. This is achieved in that, the ram 45a via the lever arm 49, holds or locates the associated splined end of torsion bar 46 in a desired angular position relative to the frame or chassis 43 of the vehicle. Should the vehicle loading increase, however, the relief valve 26 is closed due to movement of the cam surface 6 resulting from a change in attitude of the wishbone 39, and additional hydraulic medium is pumped by the piston 5 into the hydraulic ram cylinder 45, whereby the ram 45a is urged outwardly of its cylinder to cause the lever arm 49 to apply an increased value of torsion to the associated end of the torsion bar spring 46. This in turn causes the riding height of the vehicle frame or chassis 43 to be increased so as to compensate for the decrease resulting from the changed vehicle loading. In the converse case, should the attitude of the wishbone 39 change due to a decrease in vehicle loading, the cam surface 6 of the yoke 22 is moved in a direction to open the relief valve 26 and allow hydraulic medium to exhaust from the ram cylinder 45 to the reservoir 27. Thus the ram 45a retracts and relieves the torsion applied to the bar 46 by the lever arm 49, so that the vehicle riding height is decreased to compensate for the increase which took place when the load on the vehicle was reduced. As in the case of the embodiment of the invention shown in FIG. 5 of the drawings, should it not be desired to incorporate the shock absorber and control means 40 as an integral part of the suspension, the said means 40 (see FIG. 8) may be mounted on the vehicle chassis or frame independently of the upper wishbone 39, which at its inner end may simply be connected directly to the chassis or frame, a lever arm 39a being arranged to extend between said means 40 and the wishbone 47 to sense the attitude of the latter.

Figure 9:
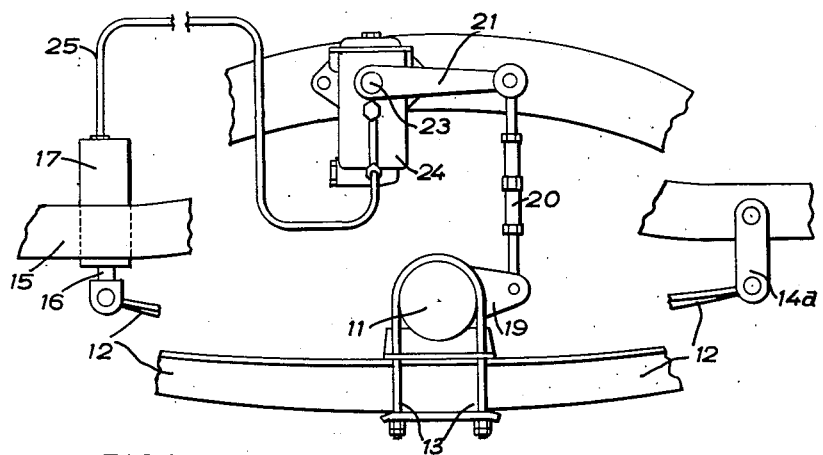

The leaf spring suspension shown in FIG. 9 is somewhat similar to that of FIG. 1, except that the hydraulic cylinder 17 is fixedly mounted on the vehicle frame 15, and variations in the length of the spring 12 arising from flexing movements thereof are accommodated by a pivotal shackle 14a pivotally secured to the frame 15 and to which the other end of spring 12 is connected. The need for trunnion bearings on the cylinder 17 is thereby avoided, and the conduit 25 may be rigid instead of flexible.

Figure 10:
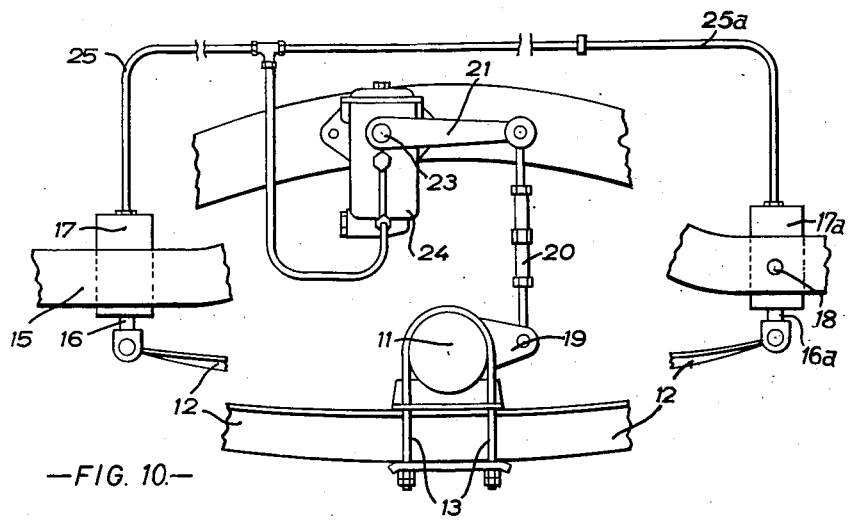
FIGS. 9 and 10 are diagrammatic side elevations of modifications of the leaf spring suspension shown in FIG. 1.

FIG. 10 shows a further modification of the invention wherein one end of the leaf spring 12, instead of being secured to the frame 15 by means of a spring shackle 14a, is carried by a second hydraulic ram 16a received in a hydraulic cylinder 17a provided with trunnion bearings 18, thus enabling variations in the length of the spring 12 to be accommodated by pivotal movement of the cylinder 17a, while the other end of the spring, as described with reference to FIG. 9, is again carried by the ram 16 of the fixedly mounted cylinder 17. The cylinder 17a is connected to the control unit 24 by means of a second conduit 25a which is, of course, flexible to allow for pivotal movement of cylinder 17a. By virtue of this embodiment of the invention, the compensation effected by the hydraulic rams 16, 16a for a change in vehicle riding height resulting from a change in vehicle loading is accomplished with only half the ram movement required to effect the same compensation when only one ram is used. Moreover, by making the rams 16, 16a of different diameters, it can be arranged that, instead of extending or retracting simultaneously as in the case when the ram diameters are equal, the ram having the smaller diameter will extend after and retract before the ram having the larger diameter.

The vehicle spring suspension system shown in FIG. 11 comprises a semi-elliptic leaf spring 12 having one of its ends secured in conventional fashion to a fixed eye 14 carried by the vehicle frame or chassis 15, and the other end similarly secured in a pivotally arranged spring shackle 14a carried by the frame or chassis. The vehicle axle 11 is secured to a mid-region of the leaf spring 12 in conventional manner by means of U-bolts 13, and carries a transversely extending platform 13a which at its outer end has pivotally secured thereto, one end of an adjustable link 20 of which the other end is pivotally secured to the free end of the control arm 21 of a double acting lever type shock absorber generally designated 24 and rigidly mounted on the vehicle frame or chassis.

Directly above the transverse platform 13a, the vehicle frame or chassis 15 has rigidly secured thereto, a hydraulic cylinder 17 wherein is displaceably housed a hydraulic ram 16 depending outwardly in the direction of said platform and terminating in a cup-like support 32 for a coil suspension spring 34. The aforesaid platform likewise carries a coil spring support 36 and the coil suspension spring 34 is arranged to extend between the two said supports i.e. is interposed between the leaf spring 12 and the vehicle frame or chassis 15. Thus, as already described with reference to FIGS. 2 and 3, when the relief valve of the shock absorber and control unit 24 is closed and the vehicle is in motion, the normal damping movements of the shock absorber pistons in their cylinders are employed to allow either or both pistons to act as a pump for the purpose of transferring hydraulic medium through the non-return valve and the hydraulic conduit 25 to the hydraulic ram cylinder 16, but when the relief valve is open this pumping action is rendered ineffective and the hydraulic ram cylinder 28 is permitted to exhaust hydraulic medium into the reservoir. The operation of the relief valve is controlled as before, by the angular disposition of the arm 21 and hence of shaft 23, dependent upon the riding height of the vehicle frame 15.

The application of the invention to pneumatic spring suspensions is shown in FIGS. 12 to 17 of the drawings. In the vehicle suspension shown in FIG. 12, each wheel mounting includes a pair of spaced parallel and pivotal levers 110 and 112. The inner ends of the lower levers 110 are pivotally secured to the vehicle frame or chassis 114, whilst the inner ends of the upper levers 112 are secured to a semi-rotary shaft or spindle 116 of a double acting, lever type shock absorber 118, the construction and operation of which is identical with that of the unit 24 described with reference to FIGS. 2 and 3.

Between each lower lever 110 and the chassis or frame 114 is mounted a two-part pneumatic suspension spring comprising an upper part 120 secured to the chassis or frame 114 and a lower part 122 secured to the lever 110, the parts 120 and 122 being movable relative to one another and being connected by means of a flexible or elastic diaphragm 124 which also serves to seal the upper part 120 to render the same a closed pneumatic chamber. These upper parts 120 of the pneumatic springs are both connected by way of conduits 126 to an air chamber 128 defined by a flexible diaphragm, bellows or the like 130 of variable internal volume mounted within a rigid, generally cylindrical housing 132. That space within the housing 132 which is not occupied by the flexible diaphragm 130 is filled with hydraulic medium and communicates by way of conduits 134 with the two shock absorbers 118.

The operation of the suspension described above is thus that whilst the vehicle loading remains unchanged, the pneumatic pressure within the spring chambers 120 and hence within the pneumatic chamber 128 is balanced by the hydraulic pressure of the medium within the housing 132. This pressure is maintained by the continual pumping action of the hydraulic shock absorbers 118 in conjunction with repeated, momentary opening of the relief valves therein. Should the loading on the vehicle increase, however, the relief valve is closed by the rotary movement of shaft 116 consequent upon displacement of the chassis or frame 114 relative to the wheel mounting, and the pumping action exerted by the shock absorbers 118 then results in additional hydraulic medium being transferred to the housing 132. This in turn results in some compression of the diaphragm 130 and movement thereof relative to the housing 132, with consequent transfer of pneumatic medium therefrom to the two spring chambers 120. The increased pressure in spring chambers 120 thereupon causes relative expansion between the two spring parts 120 and 122, which has the effect of once again raising the chassis relative to the wheel mounting.

As soon as the chassis reaches its desired riding height, the resulting restoration of the shafts 116 of the shock absorbers 118 as the levers 112 assume their mean position then again sets up repeated momentary opening of the relief valves in the shock absorbers to maintain the pressure of hydraulic medium in housing 132 substantially constant at its new value. Conversely, should the loading on the vehicle be decreased, so that the chassis or frame 114 rises with respect to the wheel mounting, then the shafts 116 are rotated by the levers 112 in such a direction as to open the relief valves of shock absorbers 118 and hydraulic medium is exhausted from housing 132 to the shock absorber reservoirs, with consequent expansion of the flexible diaphragm 130. This in turn reduces the pneumatic pressure in chambers 130 and allows the two spring parts 120 and 122 to retract relative to one another until the desired riding height of chassis 114 is restored.

Referring now to FIG. 13 there is shown a vehicle suspension wherein the pneumatic springs 136 are of bellows construction, each comprising a plurality of interconnecting and superposed toroidal chambers closed by imperforate end plates. Each pneumatic spring is secured at one end to one of the lower levers 110 and at each upper end carries a hydraulic ram 138 which is in turn secured to the vehicle chassis or frame 114 i.e. is interposed between the vehicle chassis or frame and the pneumatic spring. Each hydraulic ram is connected by the conduit 140 to one of the shock absorbers 118. In the operation of this embodiment of the invention the pumping action exerted by the shock absorbers 118, coupled with the repeated momentary opening of the relief valves incorporated therein, serves to maintain the chassis or frame 114 at the desired riding height so long as the vehicle loading remains unchanged. If the vehicle loading is increased however the relief valves are closed due to the rotary displacement of the shafts 116 by levers 112 and the shock absorbers 118 supply hydraulic medium under pressure to the hydraulic rams 138 to cause the same to extend and raise the chassis 114 relative to the wheel mounting. Expansion of the ram 138 ceases when the shafts 116 once again commence to effect repeated momentary openings of the relief valves. If the vehicle loading is decreased, of course, the relief valves open to allow hydraulic medium to exhaust from the rams back to the shock absorber reservoirs.

FIG. 14 shows an embodiment of the invention wherein a hydraulic ram cylinder 142 housing a displaceable ram 144 is secured to each of the lower levers 110. To the vehicle chassis or frame 114 are secured a pair of pneumatic pressure chambers 146, the lower faces of which are closed by flexible or elastic diaphragms 148 to which the outer ends of the rams 144 are fixedly connected. The hydraulic cylinders 142 are connected by way of conduits 150 with the shock absorbers 118. The operation of this embodiment of the invention is similar to that of the embodiment already described above, in that increased vehicle loading causes the hydraulic shock absorbers 118 to pump hydraulic medium under pressure in the cylinders 142 and so to cause extension of the rams 144 serving to raise the vehicle chassis or frame 114 until such time as the resulting rotary displacement of shafts 116 once again permits momentary operation of the relief valves. If the vehicle loading is decreased, the relief valves simply open to allow hydraulic medium to exhaust from the cylinders 142 back to the reservoirs of the shock absorbers 118.

A somewhat similar embodiment of the invention to that of FIG. 14 is shown in FIG. 15, with the difference that in FIG. 15 the hydraulic medium affecting extension of retraction of the ram is interposed between the ram and the pneumatic spring. It will be seen in FIG. 15 that the lower lever 110 has a ram 152 pivotally attached thereto and displaceable in a cylinder 154 which at its upper end is closed by a flexible diaphragm 156. The flexible diaphragm 156 is retained on the cylinder 154 by means of an annular end cap 158 which is in turn secured to the vehicle chassis or frame 114. The space enclosed by the flexible diaphragm 156 is filled with hydraulic medium supplied from the shock absorbers 118 by way of conduit 160 and the space between the flexible diaphragm 156 and the annular end cap 158 constitutes a pneumatic suspension spring. The movement of the hydraulic medium between the shock absorber 118 and cylinder 154, controlled by the relief valve as described above, results in extension or retraction of the ram 152 within cylinder 154 to compensate for increased or decreased vehicle loading.

Another embodiment of the invention, shown in FIG. 16, includes a pneumatic spring 162 of bellows construction somewhat similar to that shown in FIG. 13, the spring 162 being mounted between the lower lever 110 and the vehicle chassis or frame 114. To the lower end of the spring 162 is connected a hydraulic conduit 164 adapted to supply hydraulic medium under pressure from the shock absorber 118 to the interior of spring 162, thereby to act against a pneumatic medium filling the remainder of the interior of spring 162. The addition of hydraulic medium to spring 162 or the exhaust of hydraulic medium therefrom will be observed to result in extension or contraction of spring 162 to compensate respectively for increases or decreases in vehicle loading in much the same way as already described.

Figure 17:
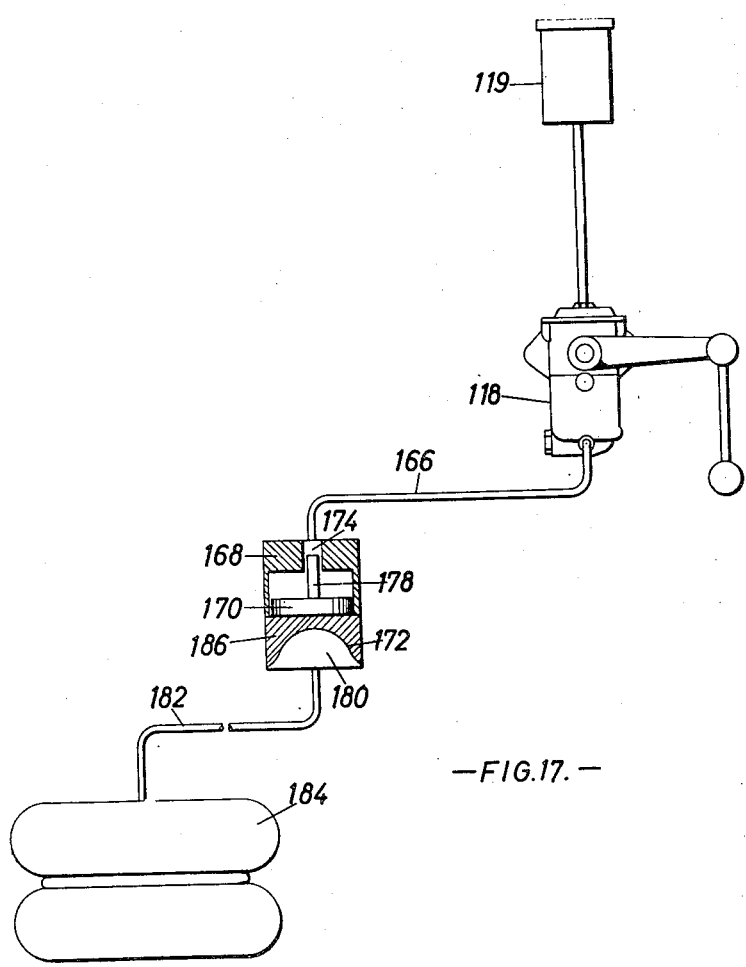
FIG. 17 is a schematic detail of a hydraulic pressure transformer for use with the embodiments of FIGS. 12 to 16.

Since pneumatic springs normally operate at comparatively low pneumatic pressures and employ relatively large volumes of pneumatic medium, whereas the shock absorbers 118 deliver hydraulic medium in relatively small amounts but at high pressure, it is often preferable to interpose a pressure transformer device between the shock absorbers and the pneumatic spring or springs with which it co-operates. One such arrangement is schematically shown in FIG. 17 wherein the shock absorber 118 (in this instance shown as being provided with an external hydraulic reservoir 119) communicates by way of a conduit 166 with a housing 168 having arranged therein a displaceable piston 170 and a displaceable diaphragm 172. The housing is formed with a relatively small diameter bore 174 into which a conduit 166 opens, and which also slidingly receives a piston rod 178 of the piston 170. The flexible diaphragm 172 co-operates with the bottom of housing 168 to define a pneumatic chamber 180 to which is connected a conduit 182 communicating wtih a pneumatic spring 184. The space 186 between the piston 170 and flexible diaphragm 172 is filled with hydraulic medium. Thus, when conditions are such that the shock absorber 118 applies a relatively small amount of high pressure hydraulic medium through conduit 166 and through bore 174, the said hydraulic medium acts to displace the piston rod 178 in bore 174 and hence displaces the piston 170 in chamber 168. Displacement of the piston 170 then results, via the hydraulic medium in chamber 186 in a somewhat higher volume change of the pneumatic medium in space 180, but said volume change takes place, of course, at a considerably lower pressure than that of the hydraulic medium in bore 174.

This application is a continuation-in-part of my co-pending application Serial No. 738,464 filed May 28, 1958, now abandoned.

I claim:

1. In a vehicle suspension system comprising a vehicle wheel mounting, a vehicle frame, a suspension spring supporting said frame upon said wheel mounting, and a double acting hydraulic shock absorber coupled between said frame and said wheel mounting to damp vibrations of said suspension spring, said shock absorber having a compression chamber and rebound chamber containing hydraulic medium connected to each other by a valve controlled passage, and a piston assembly positioned within said chambers in accordance with the displacement between said frame and said wheel mounting and operable to displace fluid from one of said chambers to the other through said valve controlled passage in accordance with relative movement between said wheel member and said frame; the improvement comprising means defining a hydraulic reservoir, a hydraulic ram means having a cylinder member and a movable member therein for varying the displacement between said wheel mounting and said frame in accordance with the pressure of hydraulic medium in said cylinder member, a first conduit connecting said cylinder member to said reservoir for transferring hydraulic medium between said cylinder member and said reservoir, a first one way valve in said conduit adjacent said reservoir normally seated to prevent flow of hydraulic medium into said reservoir, a second conduit connecting said valve controlled passage to said first conduit at a location between said first one way valve and said cylinder member, a second one way valve in said second conduit permitting flow of hydraulic medium therethrough only from said valve controlled passage into said first conduit when the pressure in said passage exceeds the pressure in said first conduit, and cam means coupled to said piston assembly for opening said first one way valve when the displacement between said wheel mounting and said frame differs from a predetermined range of displacements.

2. In a vehicle suspension as defined in claim 1, wherein said suspension spring comprises a leaf spring connected at one end to said frame and connected at an intermediate location to said wheel mounting, means connecting one member of said hydraulic ram means to said frame, and means connecting the other member of said ram means to the other end of said leaf spring.

3. A vehicle suspension as defined in claim 2, wherein the first-mentioned end of said leaf spring is connected to said frame by a pivotal shackle, and the first-mentioned member of said hydraulic ram means is fixedly connected to said frame.

4. A vehicle suspension as defined in claim 2, in which the first-mentioned member of said hydraulic ram means is fixedly connected to said frame, and further comprising a second hydraulic ram means having a cylinder member and a piston member for varying the displacement between said wheel mounting and said frame in accordance with the pressure of hydraulic medium in said last-mentioned cylinder member, means pivotally connecting one member of said second hydraulic ram means to said frame, and means connecting the first-mentioned end of said leaf spring to the other member of said second ram means.

5. A vehicle suspension as defined in claim 1, wherein said wheel mounting comprises an upper and a lower link member pivotally connected to said frame, said spring comprising spring means in compression between the frame and one of said link members, said hydraulic ram means co-operating with one end region of said spring means for deforming said spring means to thereby vary said displacement between said wheel mounting and said frame.

6. A vehicle suspension as defined in claim 5, wherein said spring means is seated at one end on one of said link members and at its other end on one member of said hydraulic ram means, the other member of said ram means being connected to said frame.

7. A vehicle suspension as defined in claim 5, wherein said spring means is a pneumatic spring seated between said frame and one of said link members, and said movable member of said hydraulic ram means is a deformable elastic member defining an air chamber within said cylinder member, said air chamber being connected to an end region of said pneumatic spring and being deformable responsive to said pressure of hydraulic medium in said cylinder member.

8. A vehicle suspension as defined in claim 6, in which said spring means is a coil spring.

9. A vehicle suspension as set forth in claim 6, wherein the suspension spring is a leaf spring secured at one end to the vehicle frame and at the other end to the hydraulic ram, and the sensing means is a lever arm displaceable by said wheel mounting and adapted to effect opening and closing of the relief valve, the consequent displacement of said ram varying the spacing from the vehicle frame, of the spring end secured to the ram.

10. A vehicle suspension as set forth in claim 6, further comprising upper and lower link members pivotally connecting the vehicle wheel mounting to the vehicle frame, and wherein the suspension spring is a coil suspension spring extending between one of said link members and said ram to support said frame, said hydraulic shock absorber being mounted on said frame independently of said link members, and the sensing means is a lever arm connected at one end to the shock absorber and at the other end to one of said link members and adapted to open and close said relief valve responsive to the pivotal attitude of the link member to which it is connected, whereby to cause the ram via said spring to modify the pivotal attitude of said link members for maintaining a substantially constant height of said frame relative to said wheel mounting.

11. A vehicle suspension as set forth in claim 6, further comprising upper and lower link members extending between the vehicle wheel mounting and the vehicle frame, the lower link member being pivotally connected at its inner end directly to said frame, and wherein the suspension spring is a coil spring extending between said lower link member and said ram to support said frame, the upper link member being pivotally connected at its inner end directly to said shock absorber to constitute said sensing means and co-operate with said relief valve in opening and closing the same responsive to the pivotal attitude of said upper link member, the consequent displacement of said ram acting through said coil spring on to said lower link member to modify the pivotal attitude thereof for maintaining a substantially constant height of said vehicle frame relative to said wheel mounting.

12. A vehicle suspension as set forth in claim 6, further comprising upper and lower link members pivotally connecting the vehicle wheel mounting to said frame, and wherein the suspension spring is a torsion bar spring journalled in bearings presented by the vehicle frame, one end of said torsion bar spring being rotarily fixed by means of said ram, the inner end of one of said link members being secured in rotarily fixed relation on said torsion bar spring, said hydraulic shock absorber being mounted on said frame independently of said link members, and wherein the sensing means is a lever arm conected at one end to the shock absorber and at the other end to one of said link members and adapted to open and close said relief valve responsive to the pivotal attitude of the link member to which it is connected, whereby to cause the ram to modify the torque in said torsion bar spring and hence to modify the pivotal attitude of said link members for maintaining a substantially constant height of said frame relative to said wheel mounting.

13. A vehicle suspension as set forth in claim 6, wherein the suspension spring is a torsion bar spring journalled in bearings presented by the vehicle frame, one end of said torsion bar spring being rotarily fixed by means of said ram, said suspension further comprising a lower link member secured at its inner end in rotarily fixed relation on said torsion bar spring, and an upper link member pivotally connected at its inner end directly to said shock absorber to constitute said sensing means, said upper link member being adapted to open and close the relief valve of said shock absorber responsive to the pivotal attitude of said upper link member, whereby to cause said ram to modify the torque in said torsion bar spring and hence to adjust the pivotal attitude of said lower link member and maintain a substantially constant height of said frame relative to said wheel mounting.

14. A vehicle suspension as defined in claim 1, wherein said wheel mounting comprises upper and lower link members pivotally supported on said frame, said suspension spring comprising a torsion bar journalled for rotation in said frame and having a crank secured to each end thereof, one crank on said torsion bar being coupled to said frame through said shock absorber and the other crank on said torsion bar being coupled to said frame through said hydraulic ram means.

15. In a vehicle suspension as defined in claim 1 wherein said suspension spring comprises a leaf spring connected at both of its ends to said frame and connected at an intermediate location to said wheel mounting, at least one auxiliary coil spring supported at one end by said leaf spring, means connecting one member of said hydraulic ram means to said frame and means connecting the other member of said ram means to the other end of said coil spring.

16. In a vehicle suspension of the type comprising a suspension spring, a vehicle wheel mounting, said spring supporting the vehicle frame relative to said wheel mounting, and a hydraulic shock absorber secured to the vehicle frame for damping resilient movements of the suspension spring, and wherein said shock absorber is a double-acting, lever-type shock absorber having a pair of cylinders containing hydraulic medium, a piston housed in each cylinder, valve means between said cylinders for controlling the flow of hydraulic medium therebetween, said valve means being arranged in a chamber between said cylinders, and a pivotal yoke coupling adjoining ends of said pistons and adapted for oscillation responsive to riding movements of said wheel mounting, the improvement comprising a hydraulic cylinder secured to the vehicle frame, a hydraulic ram displaceable in said hydraulic cylinder and co-operating with said spring for modifying the attitude thereof with respect to said frame, means for sensing variations in said spring attitude resulting from variations in vehicle loading, said chamber being formed with an outlet for hydraulic medium, a non-return valve in said outlet to permit the flow of hydraulic medium therefrom, a conduit connecting said outlet with said hydraulic cylinder, said non-return valve being adapted to pass hydraulic medium against the reaction offered by the valve means controlling hydraulic medium flow between the shock absorber cylinders, whereby at least one of said shock absorber cylinders and the piston housed therein is adapted to act as a pump for transferring hydraulic medium from said shock absorber through said conduit to said hydraulic cylinder, and a relief valve in said shock absorber communicating with said conduit and adapted to be opened and closed by said spring attitude sensing means for respectively exhausting hydraulic medium from and enabling said pump to transfer hydraulic medium to said hydraulic cylinder, the movement of hydraulic medium into and out of said hydraulic cylinder correspondingly displacing said hydraulic ram and modifying said spring attitude to maintain a substantially constant mean height of said vehicle frame relative to said wheel mounting.

17. A vehicle suspension as set forth in claim 16, wherein the shock absorber further comprises a semi-rotary shaft carrying said yoke, a lever arm connected between said semi-rotary shaft and said wheel mounting to constitute means for sensing said spring attitude, said relief valve being arranged adjacent said shaft, and means on said shaft for opening and closing the relief valve responsive to said spring attitude.

18. A vehicle suspension as set forth in claim 17, wherein said yoke presents a cam surface arranged to be incident upon a relief valve opening member when said semi-rotary shaft is in a mean angular position determined by said mean height of the vehicle frame.

19. A combined vehicle shock absorber and hydraulic pump, comprising an at least partly hollow body member, the hollow interior of said body member constituting a reservoir for hydraulic medium, a pair of cylinders in said body member, a piston displaceable in each cylinder, a semi-rotary spindle journalled in said body member and extending across the hollow interior thereof, said spindle being adapted for the application of vehicle riding movements thereto, means connecting adjoining ends of said pistons to said spindle for displacement of said pistons within said cylinders responsive to turning movement of said spindle, said body member being formed with a chamber connecting the ends of said cylinders remote from said spindle to permit the flow of hydraulic medium between said cylinders responsive to piston displacement, valve means in said chamber to restrict said flow of hydraulic medium and damp said piston movements, said body member being further formed with a part extending between said chamber and the exterior of said body member, a non-return valve in said port and adapted to pass hydraulic medium out of said chamber against the reaction offered by said flow restricting valve means, passage means including a plunger operated check valve in said body member connecting said reservoir with said port on the delivery side of said non-return valve, and cam means carried by said spindle for displacing the operating plunger of said check valve to open said check valve whenever said spindle exceeds a predetermined normal range of angular displacements relative to said body member.

References Cited in the file of this patent

UNITED STATES PATENTS

| 2,161,431 | Rabe | June 6, 1939 |
| 2,323,204 | Cross | June 29, 1943 |
| 2,825,579 | Heiss | Mar. 4, 1958 |
| 2,912,235 | Walker | Nov. 10, 1959 |